United States Patent
Gunter

Patent Number: 6,007,073
Date of Patent: Dec. 28, 1999

[54] BUSH HOG TRACTOR BALANCING DEVICE

[76] Inventor: W. C. Gunter, 115 Sugar Hollow Rd., Pigeon Forge, Tenn. 37862

[21] Appl. No.: 08/911,495

[22] Filed: Aug. 14, 1997

[51] Int. Cl.[6] .................................................. B62D 37/00
[52] U.S. Cl. ...................... 280/6.153; 280/754; 280/755
[58] Field of Search .............................. 280/6.15, 6.153, 280/6.154, 6.151, 6.152, 6.155, 6.159, 6.16, 124.157, 754, 755; 254/423

[56] References Cited

U.S. PATENT DOCUMENTS

| | | | |
|---|---|---|---|
| 2,934,356 | 4/1960 | Killinger | 280/6.15 |
| 4,382,604 | 5/1983 | Nakagawa | 280/6.153 |
| 4,641,843 | 2/1987 | Morrisroe | 280/6.153 |
| 4,746,133 | 5/1988 | Hanser et al. | 280/6.153 |
| 4,923,210 | 5/1990 | Heider et al. | 280/6.153 |

Primary Examiner—Paul N. Dickson
Attorney, Agent, or Firm—Pitts & Brittian, P.C.

[57] ABSTRACT

A tractor balancing device capable of providing vertical support to the frame of a side-mounted bush hog. The balancing device consists of an inflatable and deflatable air bag secured between a platform placed above the right, front axle of a bush hog tractor, and a bracket affixed to the frame of the side-mounted bush hog. The air bag is connected to an air compressor and receives air by means of an air hose. A system of pressure regulation is provided so as to control the level of air pressure within the air bag. If, during operation of the bush hog, either the moment of the bush hog arm or the incline of the surface causes the tractor to tilt in the direction of the bush hog arm, the air bag can be inflated. This stiffens the frame of the bush, preventing it from pivoting and tilting the tractor. The moment applied to the tractor is reduced by virtue of the upward force applied by the air bag onto the frame of the bush hog. The air bag can be deflated when the bush hog is not in use, or when the bush hog tractor is in danger of tilting away from the bush hog arm. Thus, the inflation and deflation of the air bag serves to balance the tractor.

10 Claims, 7 Drawing Sheets

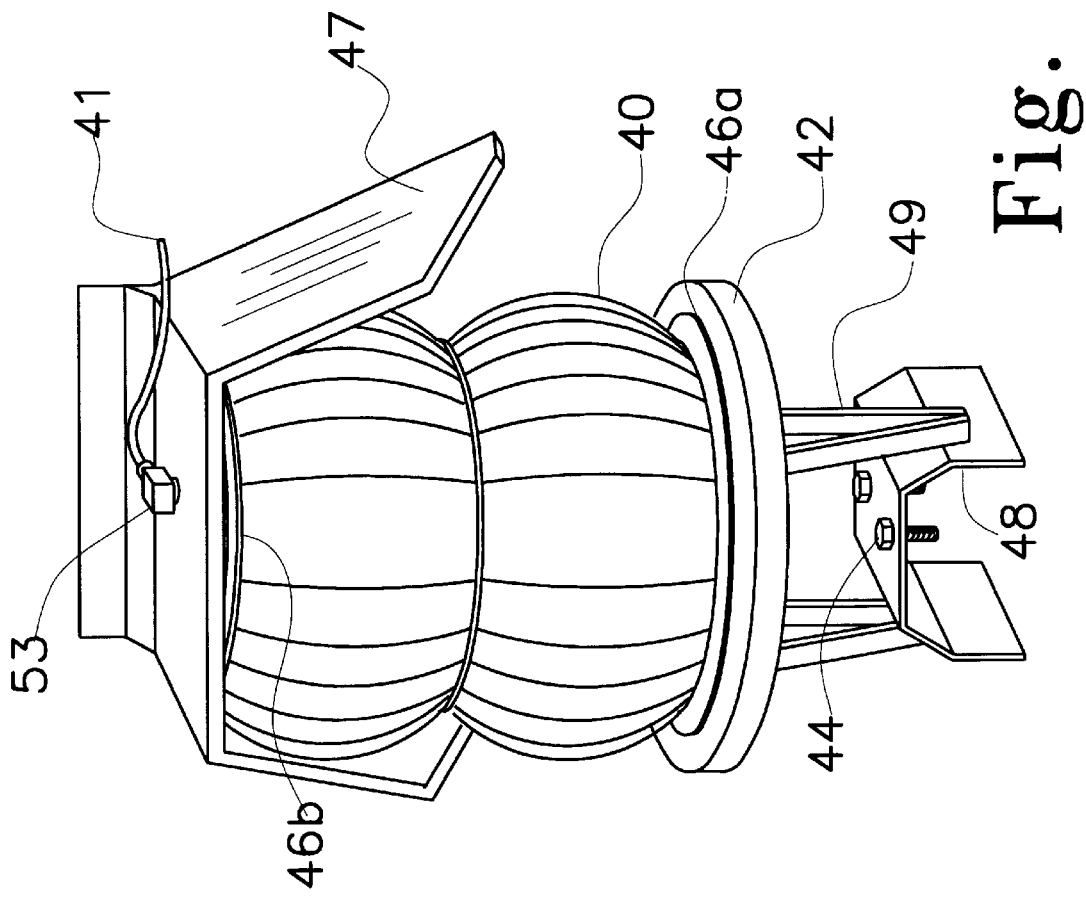
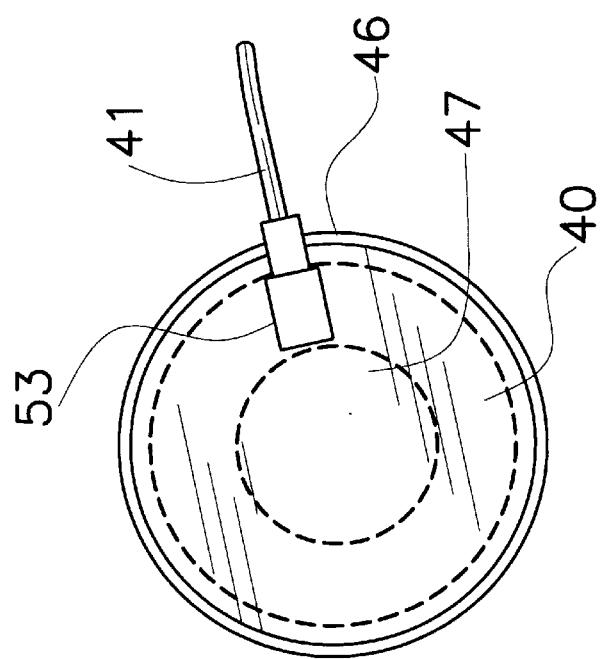
Fig. 3
Fig. 4

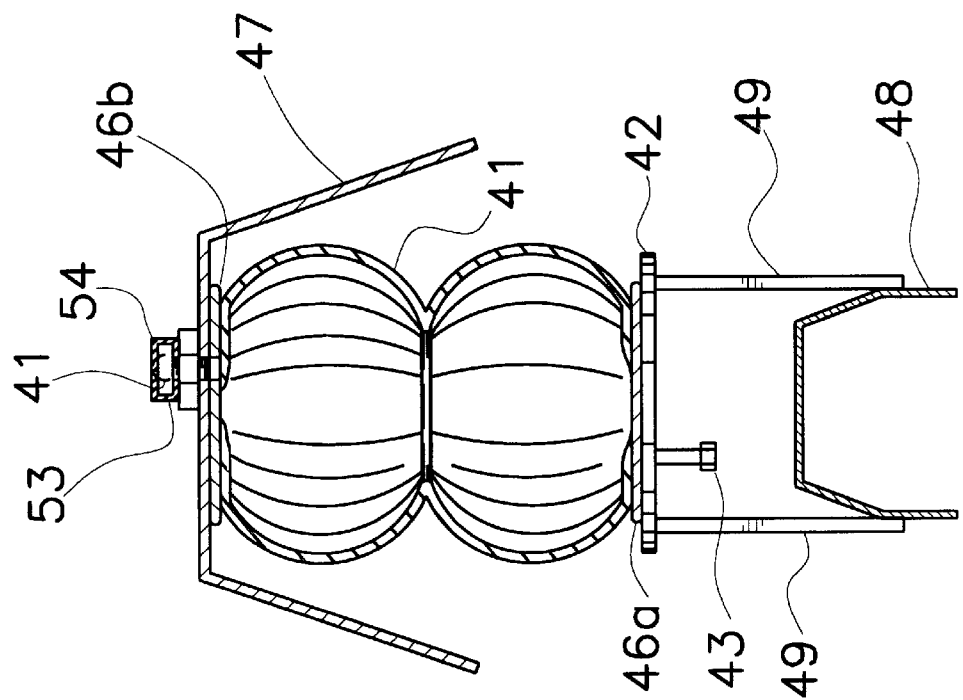
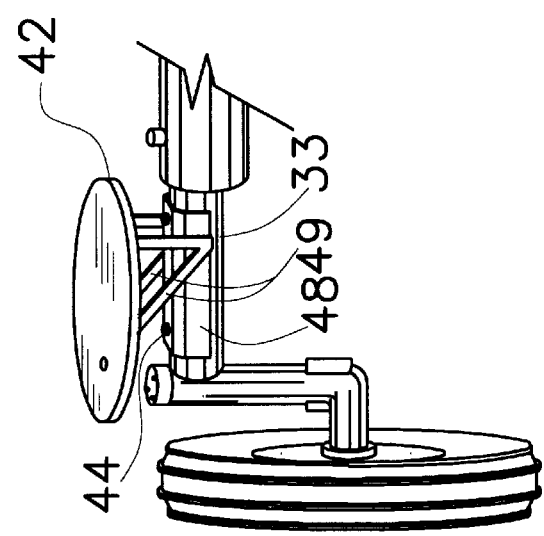
Fig. 8
Fig. 7

6,007,073

BUSH HOG TRACTOR BALANCING DEVICE

TECHNICAL FIELD

This invention relates to the field of balancing devices on motorized vehicles; more specifically it pertains to a mechanism for adjustably stiffening the frame of a bush hog on a bush hog tractor through the use of an inflatable/deflatable air bag so as to prevent the bush hog tractor from tilting during use.

BACKGROUND ART

Motorized vehicles are commonly used not only to transport people, but also to lift and carry loads. Many vehicles have within them a mechanism for lifting or carrying objects. For example, some trucks carry a fork lift from the rear bed of the truck. The rear bed of the truck is configured to receive the forks of a fork lift, enabling the truck to transport the fork lift. Also, some tractors carry a side-mounted bush hog consisting of an extendable mechanized arm with a rotating mower blade at the end of the arm. The bush hog has a frame which mounts onto the tractor. This allows the tractor to transport the bush hog and use it to cut vegetation adjacent to a roadway.

There is a danger inherent in the use of lifting or carrying devices on motorized vehicles. That danger occurs when the moment applied to the vehicle from the device being lifted or carried is increased, causing the vehicle to tilt or even fall over. If the moment, or angular force, applied to a truck or tractor by the operation of the lifting or carrying device increases beyond the gravitational force created by the weight of the truck or tractor itself, tilting will occur. In this instance, the weight of the vehicle will not be sufficient to prevent tilting.

Moment is a product of several factors. One factor is the amount of force applied to the lifting or carrying arm. Another variable is the angle at which force is applied to the moment arm. A third factor is the radius away from the object at which the force is applied. A sufficient increase in either the force applied to an object or the distance from an object at which the force occurs will increase the moment and cause rotation in the body securing the lifting device.

In the context of motorized vehicles with a lifting or carrying device, moment will increase when the downward force on the device increases. This occurs when the lifting device attempts to lift a heavier load. Moment will also increase when either the length or the radius of the moment arm increases.

It is critical that a motorized vehicle with a lifting device stay balanced. If such a vehicle becomes too far out of balance, it could tilt over causing damage to the vehicle and, possibly, personal injury. For example, a dump truck which becomes out of balance while dumping a load of dirt into a hole could tilt backwards, causing the truck and the driver to flip into the hole.

In order to avoid tilting, motorized vehicles have employed one of two types of balancing devices. The first type involves a counter-weight attached to the vehicle opposite the lifting device. For example, a weight may be attached to a fulcrum or to the hub of a wheel opposite the lifting mechanism. The utility of a counter-weight is that it increases the gravitational force on the vehicle opposite the lifting mechanism so as to counter-act the angular force applied by the load during lifting. However, the added weight also means that the truck or tractor must be engineered to move a considerably heavier load. This raises the cost of the vehicle and reduces fuel economy. It also makes handling the vehicle difficult in the event of a flat tire or in the event towing is necessary.

The second type of balancing device employs legs extendable from the side of the vehicle in the direction of the lifting mechanism. The legs are usually connected to pads which rests on the ground. The legs provide support to the vehicle to avoid tilting. However, this type of balancing mechanism only has utility when the vehicle is stationary.

The prior art fails to teach a device which can provide additional vertical support for a side mounted lifting or carrying mechanism while the vehicle is moving. Such a device counter-acts the downward force applied at the end of the moment arm without adding additional weight to the vehicle itself. If the vehicle begins to tilt in the direction of the load being lifted, the frame upon which the lifting or carrying device is mounted is adjustably stiffened, thereby accomplishing a balancing of weight. It is an object of the present invention to provide a device for counter-acting the gravitational force applied to a lifting or carry device attached to a motorized vehicle.

It is also an object of this invention to provide a device by which the frame of a lifting device secured to a motorized vehicle may be stiffened relative to the vehicle itself, thereby preventing tilting during operation.

It is an additional object of the present invention to provide a device which will balance a vehicle having a lifting or carrying device while the vehicle is moving.

It is another object of the present invention to secure an adjustably inflatable air bag to both the frame of a lifting or carrying device on a motorized vehicle and an axle of that vehicle in such a manner that inflation of the bag counter-acts the gravitational force applied to the moment arm when the lifting or carrying device is employed.

It is a further object of this invention to place an inflatable/deflatable air bag between the right, front axle of a tractor and a mounting plate attached to the frame of a side-mounted bush hog in such a manner that the air bag may be inflated when the tractor begins to tilt towards the side where the bush hog is mounted, and may be deflated should the tractor begin to tilt towards the opposite side, thereby allowing the tractor to be balanced during operation of the bush hog.

DISCLOSURE OF THE INVENTION

Other objects and advantages will be accomplished by the present invention which provides a device for reducing the moment applied to a motor vehicle during the operation of an attached lifting device. The preferred embodiment of this invention is comprised of an adjustably inflatable air bag placed between (1) the front axle mount of a tractor near the right front tire, and (2) a bracket affixed to the frame of a side-mounted bush hog above the right, front axle. The bag is connected to an air hose which is attached to an air compressor and an air tank. The bag may be inflated by activating the air compressor. Inflating the bag will stiffen the frame of the bush hog relative to the tractor, thereby preventing it from pivoting. When this occurs, the moment applied to the tractor is reduced because the force of gravity applied to the moment arm is counter-acted.

If, during operation, the tractor begins to tilt away from the side it where the bush hog is mounted because of the incline on which the tractor sits and the positioning of the bush hog, the air bag can be returned to its deflated state. This removes the upward force created by the stiffening of the bush hog frame. Thus, the inflation and deflation of the bags can effectuate a balancing of the tractor.

BRIEF DESCRIPTION OF THE DRAWINGS

The above mentioned features of the invention will become more clearly understood from the following detailed description of the invention read together with the drawings in which:

FIG. 3 is a top view of the air bag of the present invention resting between two circular plates and connected to an air hose;

FIG. 4 is a perspective view of the air bag of FIG. 1, placed between the brackets and plates of the present invention and an air hose;

FIG. 7 is a perspective view of the bottom plate of the present invention which supports the air bag of the present invention, as placed onto the right, front axle of a tractor; and FIG. 8 is a side view, in cross-section, of the air bag of FIG. 1, placed between two circular plates and between the axle bracket and the frame bracket of the present invention.

DESCRIPTION OF PREFERRED EMBODIMENT

Figure 1:
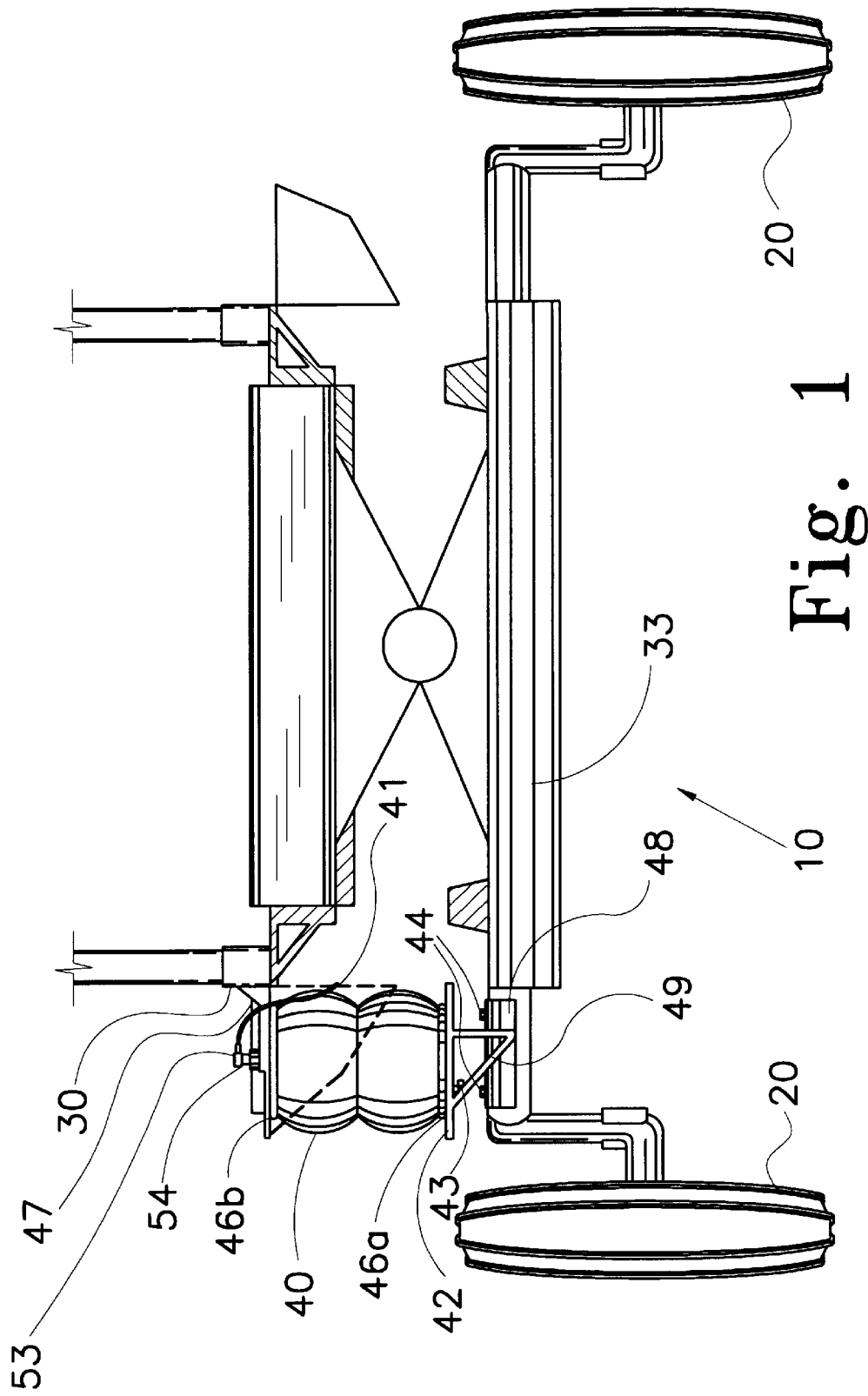
FIG. 1 is an elevation view of the air bag of the present invention in an inflated stated, placed between two circular plates and resting on a front axle bracket of the present invention.

A preferred embodiment of the present invention is shown generally at 10 in the elevation view of FIG. 1. FIG. 1 demonstrates a tractor 10 having an air bag placed between two circular plates 46. The bottom plate 46a is mounted above a bracket 42 which is affixed above the right end of the front axle 33. The top plate 46b is secured below a bracket 47 which is welded to the frame 30 of a side-mounted bush hog 32. The air bag 40 is inflatable and deflatable, and rests between the two circular plates 46.

Figure 2:
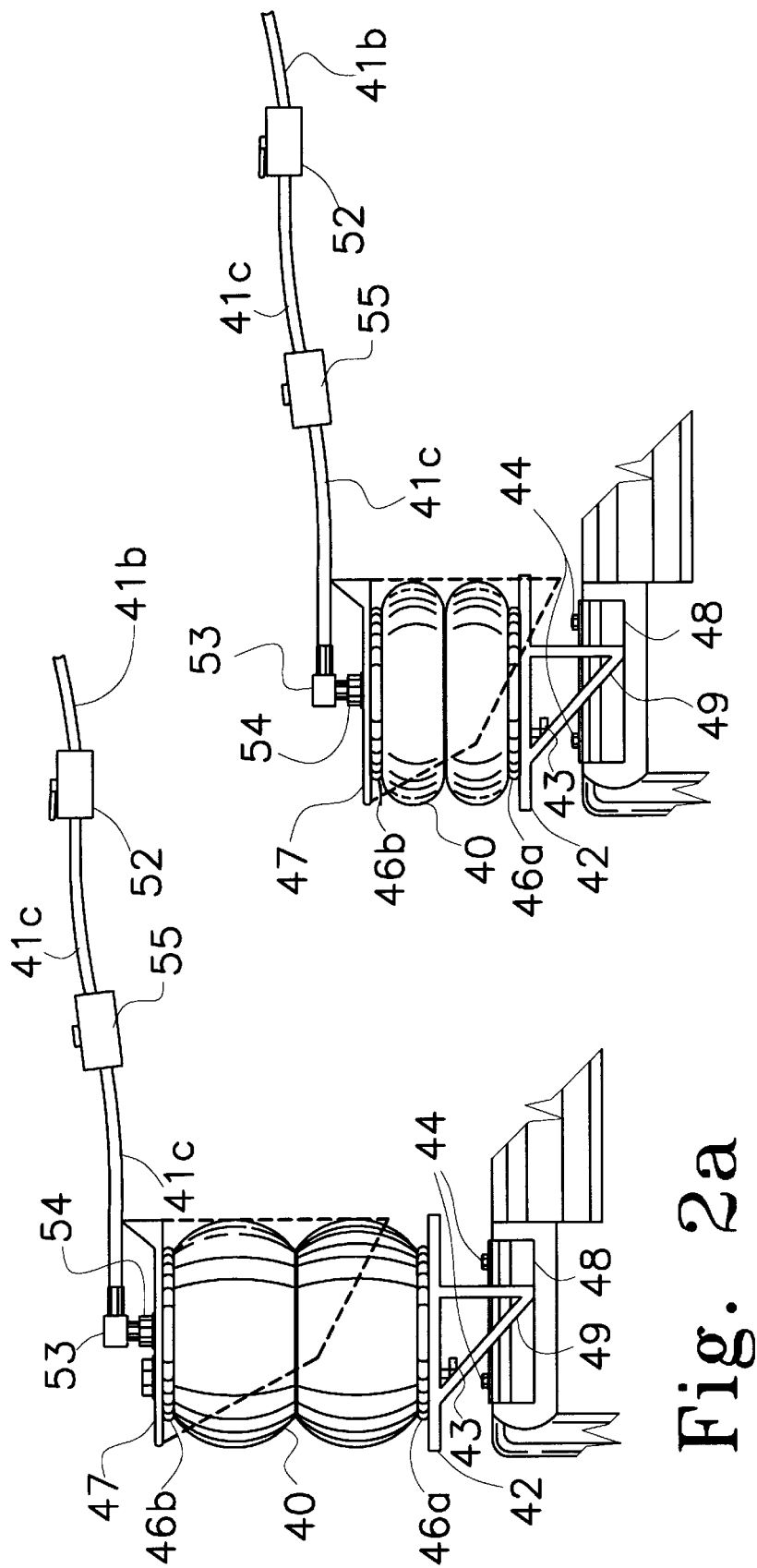
FIG. 2a is an elevation view of the air bag of the present invention connected to a typical air hose, and resting between two circular plates, one plate being placed above the right, front axle of a tractor, and the other attached to a bracket affixed to the frame of a side-mounted bush hog, with the air bag being in a state of inflation.
FIG. 2b is also an elevation view of the air bag of the present invention connected to a typical air hose, and resting between two circular plates, except the air bag is in a state of very slight inflation.
Figure 5A:
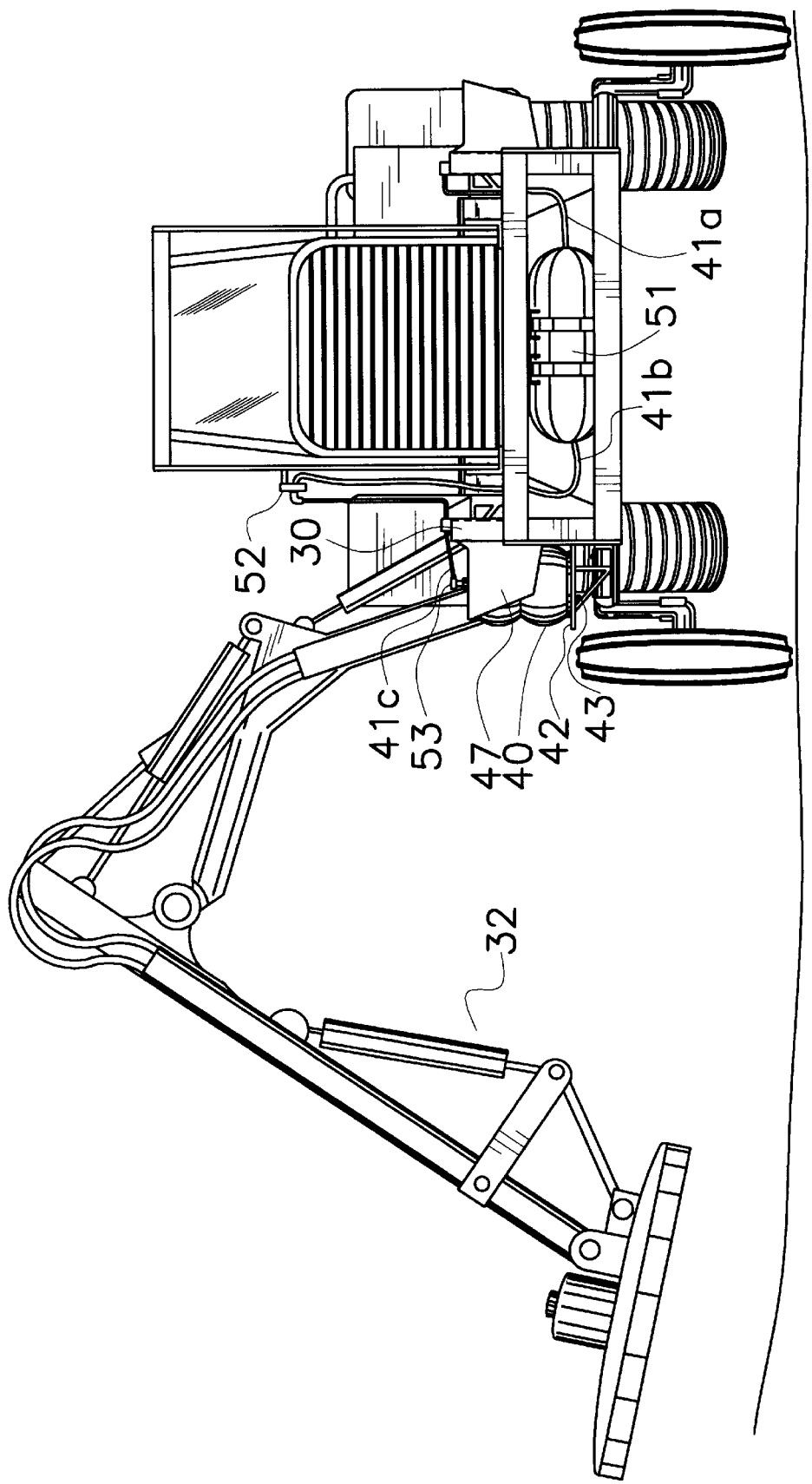
FIG. 5a is a front elevation view of a balanced bush hog tractor, with the air bag of FIG. 4 in place in its inflated state.
Figure 5B:
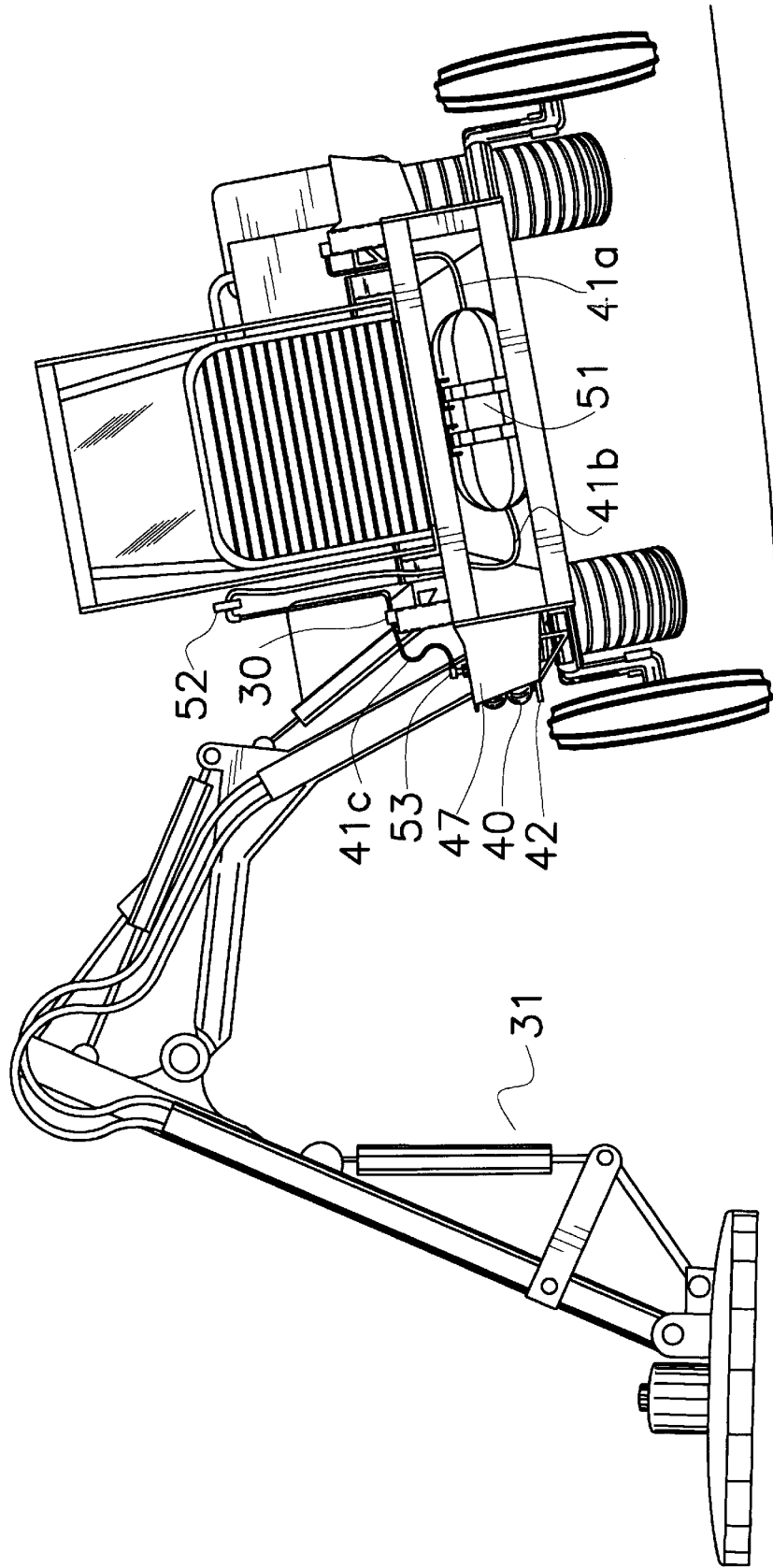
FIG. 5b is a front elevation view of an imbalanced bush hog tractor, with the air bag of FIG. 4 in place in a deflated state.

FIG. 1 and FIG. 4 show the air bag 40 in a state of inflation. Inflation is accomplished through the use of a typical air compressor 50 (not shown in FIG. 2 and FIG. 4). The air compressor 50 may be transported separate from the tractor 10, though typically it is carried on or mounted to the back of the tractor 10. In the preferred embodiment, the air compressor 50 must be capable of compressing air at a pressure of up to 120 pounds per square inch. Likewise, the air bag 40 is capable of withstanding up to 120 pounds per square inch of pressure, though it is recommended that no more than 100 pounds of pressure be applied to the standard air bag.

In the preferred embodiment, the air bag 40 is an inflatable and deflatable bladder composed of an airtight, expandable material such as latex or rubber. It is configured as an inner tube with a concentric ring having a bottom plate 46a as its bottom surface and a top plate 46b as its top surface. The air bag 40 receives and releases air through a nozzle 54 which extends upward from the inner tube through the top plate 46b. In one embodiment, the nozzle 54 is threaded and has an outer diameter of 12.695 mm (½ inch). The air bag 40 is typically configured as an inner tube, and has an outer diameter of approximately 30.48 cm (12 inches) in its inflated state.

Air is transported from the air compressor 50 to the air bag 40 by means of a hose 41. The air hose 41 is of sufficient length to allow it to connect comfortably with the air compressor 50 and the air bag 40 without stretching or crimping. The air hose 41 is comprised of a material such as rubber which is both pliable and capable of withstanding up to 120 pounds of pressure. In one embodiment, the air hose 41 is approximately 9.521 mm (⅜ inch) in outer diameter. Its wall thickness is approximately 3.174 mm (⅛ inch).

The air hose 41 is in fluid communication with the air bag 40 by a typical hose connection device 53. This is a threaded connector or some other fastener which attaches to the nozzle 54 of the air bag 40. The nozzle 54 extends through the top plate 46b of the bag 40, and through a hole machined in the the bush hog bracket 47. The nozzle 54 is then attached to the hose 41 by means of connector 53.

In order to ensure efficient operation of the air bag 40, a means is provided for regulating air pressure within the bag 40. Regulation is important in that operation of the bush hog tractor 10 with the air bag 40 in an inflated state will force the air bag 40 to assist in supporting the bush hog arm 31. When the tractor 10 encounters uneven terrain, or when the bush hog arm 31 is moved up and down, additional pressure is placed on the bag 40 externally. In the preferred embodiment of the invention, a pressure regulation system is installed between the air compressor 50 and the air bag 40. This is done by placing an air tank 51, a regulator 52, and a check valve 55 in series with the air compressor 50 and the air bag 40.

Figure 6:
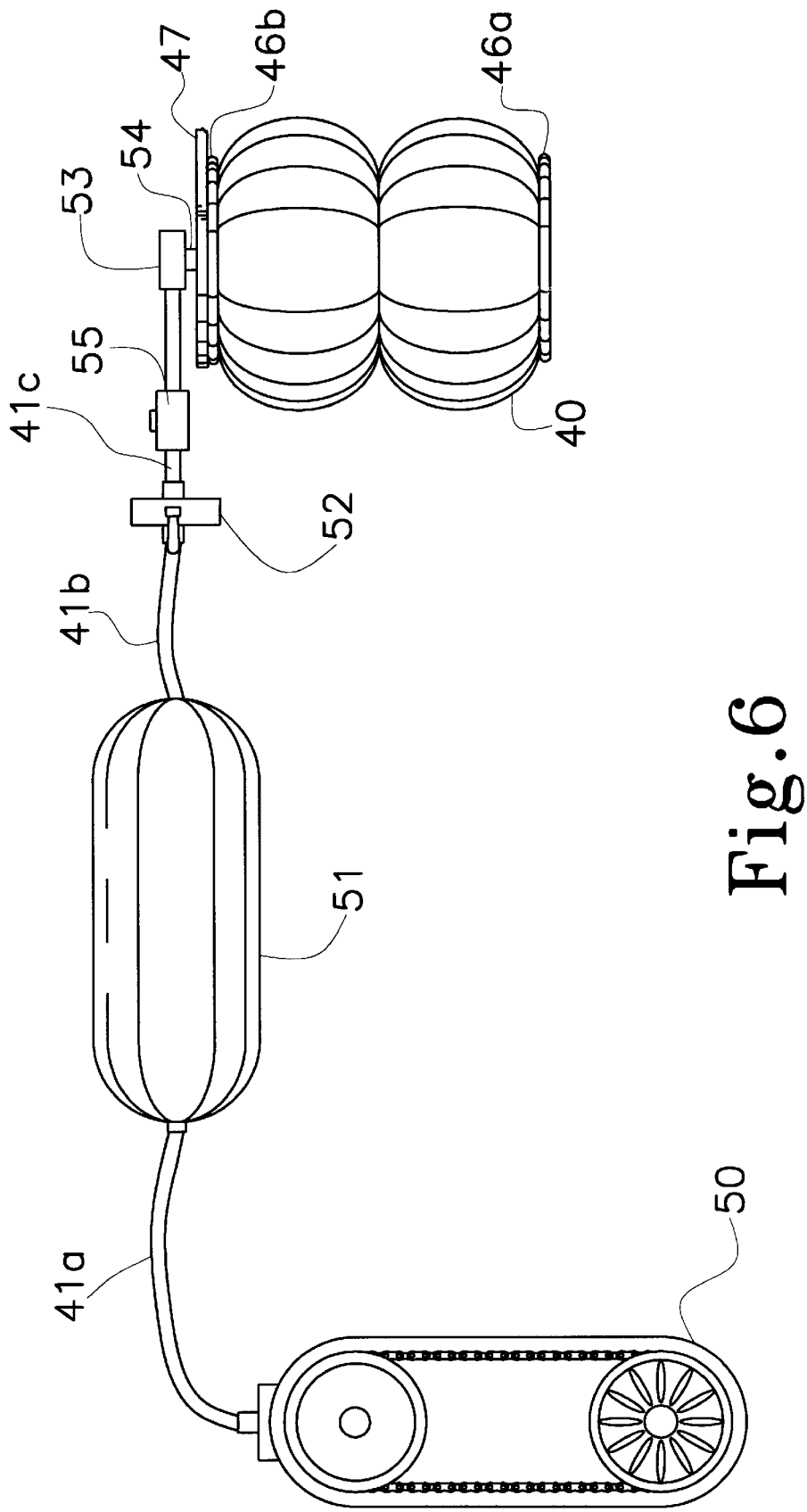
FIG. 6 depicts an air compressor in pneumatic communication with an air tank, a regulator, a check valve, and an air bag of the present invention.

FIG. 6 depicts an air compressor 50 connected to an air tank 51, a regulator 52, a check valve 55, and the air bag 40. Pneumatic connection of these parts is accomplished by means of air hoses 41a–41c. These air hoses 41a–41c are of a length sufficient to connect the air pressure regulation equipment in the series as shown in FIG. 6.

The tank 51 may be of any shape, though typically it is cylindrical. It may be of any material, though ideally it is metallic in composition for added strength. In the preferred embodiment, a five to seven gallon tank 51 is considered adequate for the reservoir of air necessary to regulate pressure in the air bag 40. In the preferred embodiment, the tank 51 is capable of holding air at up to 150 pounds per square inch of pressure.

The air tank 51 serves primarily as a storage vessel for pressurized air. The tank 51 stores air being transported between the air compressor 50 and the air bag 40. The tank 51 receives air from the compressor 50 through one hose 41a, and passes that air to a regulator 52 through a second hose 41b. The function of the regulator 52 is to provide a means for establishing the level of air pressure within the air bag 40. In the preferred embodiment, when pressure inside the air bag 40 is less than 100 pounds per square inch, the regulator 52 releases air to hose 41c which is fluidly connected to the air bag 40.

In order to further regulate the level of air pressure within the air bag 40, a check valve 55 is placed between the regulator 52 and the air bag 40 in hose 41c. If the air pressure within the air bag 40 exceeds the level set by the regulator 52, the check valve 55 releases air from the air bag 40 into the atmosphere. This allows the system to adjust pressure within the air bag 40 to accommodate outside forces. Those skilled in the art will understand that pressure within the system originates at the compressor 50 which has a standard internal governor (not shown).

In one embodiment of this invention, the bottom plate 46a of the air bag 40 is mounted onto a platform 42 above the right, front axle 33 of a tractor 10. The platform 42, depicted in FIG. 7, horizontally rests above a mounting body 48 formed to fit over a tractor axle 33. The platform 42 is supported above the mounting body 48 by bars 49 welded to the mounting body 48 and the platform 42. The mounting body 48 is secured to the front axle 33 by bolts 44 which are inserted through holes previously existing in the axle 33.

Above the air bag 40 is a bracket 47 which is welded or fastened to the frame 32 of the bush hog. The air bag 40 is secured underneath the bush hog bracket 47 by means of fastener 53 attached to nozzle 54.

Means for securing the air bag 40 to platform 42 are also provided. In the preferred embodiment, this is accomplished by using a slip bolt 43. The slip bolt 43 is 7.62 cm to 10.16 cm (3 to 4 inches) in length, and is placed through holes machined in the bottom plate 46a and platform 42. These holes, of course, must be aligned so that the bolt 43 can easily pass through them. Those skilled in the art will understand that a slip bolt 43 is preferred over a conventional bolt. The slip bolt 43 will allow the air bag 40 to lift off of platform 42 in the event the bush hog frame 30 substantially pivots away from the bush hog arm, 32 thereby preventing a tear or rupture of the air bag 40. To this end, the holes for the bolt 43 must be of sufficient circumference to allow the bolt 43 to slidably move within the holes.

The preferred embodiment of the present invention is called into use when the tractor is about to tilt due to operation of the bush hog 32. Tilting in the direction of the bush hog arm 32 might occur when the arm 32 is extended or when the tractor 10 is placed on an incline. Either of these events will cause an increase in moment acting on the tractor 10.

A tractor 10 in this situation can be balanced by inflating the air bag 40. Those skilled in the art will understand that inflation of the bag 40 will create vertical support for the frame 30 of the bush hog arm 32 on that side of the tractor 10 where the bush hog arm 32 is extending. This causes the frame 30 to stiffen and be stabilized, thereby preventing the frame 30 from pivoting. This, in turn, balances the tractor 10 and keeps the bush hog arm 32 from falling to the ground or dragging. The bush hog 32 is then able to perform its cutting function while the tractor 10 is moving.

The description given above presents a bush hog tractor balancing device designed to prevent a bush hog tractor from tilting during operation. Numerous alternative embodiments for this balancing device do exist, both in terms of the type of balancing device used and the placement of the balancing device.

In the preferred embodiment, the balancing device is an adjustably inflatable air bag 40 having a pressure regulation system. However, the balancing device could be any apparatus capable of adjustably providing support between platform 42 and bracket 47. Examples include a pneumatic jack or a mechanical jack.

Regarding the placement of the balancing device, the device could be placed under the left front axle of the bush hog tractor 10 rather than over the right front axle. Operation of the balancing device in this position would require that the bottom plate 46a of the air bag 40 be secured to the left side of the bush hog frame 30 by means of brackets. Increased vertical support of the brackets caused by activation of the balancing device results in a downward force applied to the frame 30 of the bush hog opposite the bush hog arm 32, thereby counter-acting the moment caused by gravitational force on the bush hog arm 32.

From the foregoing description, it will be recognized by those skilled in the art that a balancing device offering advantages over the prior art has been provided. Specifically, the balancing device defines an adjustably inflatable air bag secured between two horizontal plates, with the bottom plate being slideably attached to a platform secured to the front axle of a bush hog tractor at that end where the bush hog arm operates, and the top plate being secured to the bush hog frame. In this manner, the frame of the bush hog can be stiffened so as to prevent pivoting. Inflating the air bag provides vertical support to the lifting arm of the bush hog, thereby counter-acting the moment applied to the bush hog arm. Thus, the air bag provides a means for preventing a bush hog tractor from tilting during its operation.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention,

I claim:

1. A counter-balancing device on a motorized vehicle having an extendable load bearing mechanism, the motorized vehicle having an axle having left and right ends, and the load bearing mechanism including a frame for mounting onto the vehicle, said counter-balancing device comprising:

a bottom platform;

means for securing said bottom platform to the axle of the motorized vehicle near an end;

a frame bracket;

means for securing said frame bracket to the frame of the extendable load bearing mechanism above said bottom platform; and a lifting device positioned between said bottom platform and said frame bracket capable of vertically separating said bottom platform from said frame bracket so as to provide vertical support for the frame of the extendable load bearing mechanism, thereby preventing the motorized vehicle from tilting when the extendable load bearing mechanism is extended.

2. The balancing device of claim 1 wherein said lifting device is an inflatable and deflatable air bag having a top surface and a bottom surface, said top surface being affixed to said frame bracket, and said bottom surface being affixed to said bottom platform, and wherein means are provided for inflating and deflating said air bag.

3. The balancing device of claim 1 wherein said means for securing said bottom platform to the axle of the motorized vehicle is by attaching it to an axle bracket mounted above the axle by means of bolts which are received in the axle, and said frame bracket includes a horizontal plate.

4. The balancing device of claim 3 wherein said lifting device comprises:

an inflatable and deflatable air bag configured to define an expandable inner tube with a concentric ring having a top plate and a bottom plate, said top plate being affixed to said horizontal plate of said frame bracket, and said bottom plate being affixed to said bottom platform;

a nozzle for receiving and releasing air which extends from said inner tube and through said top plate; and means for inflating and deflating said air bag through said nozzle.

5. The balancing device of claim 4 further comprising a slip bolt placed through vertically aligned holes formed in said bottom platform and said bottom plate of said air bag in such a manner that said bottom plate of said air bag may vertically separate from said bottom platform should the frame of the lifting mechanism pivot away from the extendable load bearing mechanism.

6. The balancing device of claim 4 wherein the means for inflating and deflating said air bag includes:

an air compressor;

an air hose having a first end and a second end, said first end being connected to said air compressor, and said second end being connected to said nozzle of said air bag so as to establish fluid communication between said compressor and said air bag; and means for fluidly and sealingly connecting said first end of said air hose with said compressor, and said second end of said air hose with said nozzle.

7. The balancing device of claim 6 further comprising a pressure regulation system for maintaining air pressure in said air bag, said pressure regulation system including:

an air compressor;

an air tank;

an air regulator to establish the level of air pressure within said air bag;

a check valve to allow excess air in said air bag to release to the atmosphere;

a first air hose connected between said air compressor and said air tank to sealingly establish fluid communication therebetween;

a second air hose connected between said air tank and said regulator to sealingly establish fluid communication therebetween;

a third air hose connected between said regulator and said check valve;

a fourth air hose connected between said check valve and said nozzle of said air bag to sealingly establish fluid communication therebetween; and a connector connecting said fourth air hose to said nozzle of said air bag.

8. A counter balancing device for a tractor having a bush hog extending on its right side, the tractor having a front axle with left and right ends, and the bush hog having a frame for side-mounting to the tractor, said balancing device comprising:

an axle bracket mountable on the right end of the front axle, said axle bracket being secured to the axle by means of two bolts which fit in holes pre-existing in the top of the axle;

a horizontal bottom platform secured on top of said axle bracket by means of supporting bars which are welded to said axle bracket and said horizontal bottom platform;

a frame bracket weldable to the frame of the bush hog, said frame bracket including a horizontal plate situated above said horizontal bottom plate;

an inflatable and deflatable air bag configured to define an expandable inner tube with a concentric ring having a top plate and a bottom plate, said top plate being affixed to said horizontal top plate of said frame bracket, and said bottom plate being affixed to said horizontal bottom platform, said air bag being capable of vertically separating said horizontal plate of said frame bracket from said horizontal bottom platform when inflated, thereby supporting the frame of the bush hog relative to the axle;

a nozzle on said air bag for receiving and releasing air which extends from said inner tube and through said top plate and said horizontal top plate of said frame bracket;

a pressure regulation system for maintaining air pressure in said air bag which includes an air compressor, an air tank, an air regulator which sets the level of air pressure within said air bag, a check valve which serves as a means for releasing excess air from said air bag, a first air hose connected between said air compressor and said air tank to establish fluid communication therebetween, a second air hose connected between said air tank and said regulator to establish fluid communication therebetween, a third air hose connected between said regulator and said check valve to establish fluid communication therebetween, a fourth air hose connected between said check valve and said nozzle of said air bag to establish fluid communication therebetween, and a connector connecting said fourth air hose to said nozzle of said air bag; and a slip bolt placed through vertically aligned holes formed in said bottom platform and said bottom plate of said air bag in such a manner that said bottom plate of said air bag may vertically separate from said bottom platform according to the length of said slip bolt should the frame of the lifting mechanism pivot away from the extendable load bearing mechanism.

9. A counter-balancing device on a motorized vehicle having an extendable load bearing mechanism, the motorized vehicle having an axle having left and right ends, and the load bearing mechanism including a frame for mounting onto the vehicle, said counter-balancing device comprising:

a bottom platform secured to the axle of the motorized vehicle near the end of the axle closest to the side on which the lifting mechanism is mounted;

a frame bracket secured to the frame of the extendable load bearing mechanism above said bottom platform; and a lifting device positioned between said bottom platform and said frame bracket capable of vertically separating said bottom platform from said frame bracket so as to provide vertical support for the frame of the extendable load bearing mechanism, said lifting device capable of being activated when the extendable load bearing mechanism is extended thereby preventing the motorized vehicle from tilting.

10. The balancing device of claim 9 wherein said bottom platform is secured to the axle of the motorized vehicle by attaching it to an axle bracket mounted above the axle by means of bolts which are received in the axle, and wherein said frame bracket includes a horizontal plate.

* * * * *